3,368,315
EXTRUDED METAL FLOOR SECTION FOR VEHICLES AND THE LIKE
Carl O. Thurnau, New Hartford, N.Y., assignor to Revere Copper and Brass Incorporated, Rome, N.Y., a corporation of Maryland
Filed July 23, 1965, Ser. No. 474,251
2 Claims. (Cl. 52—588)

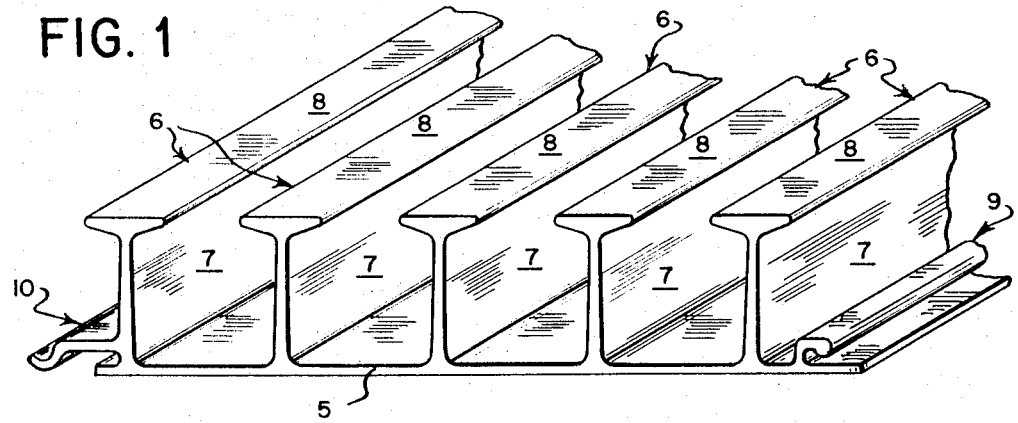
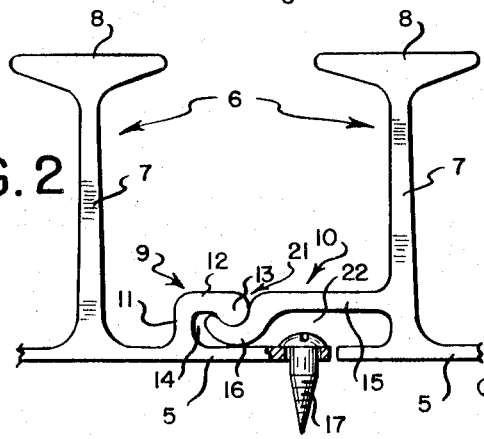
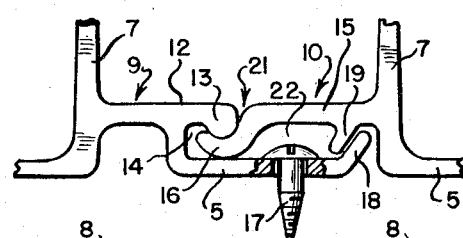
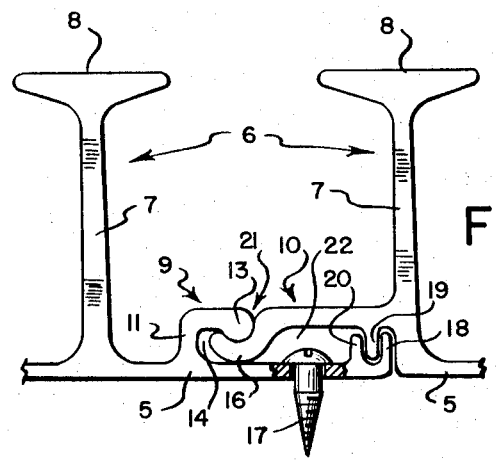
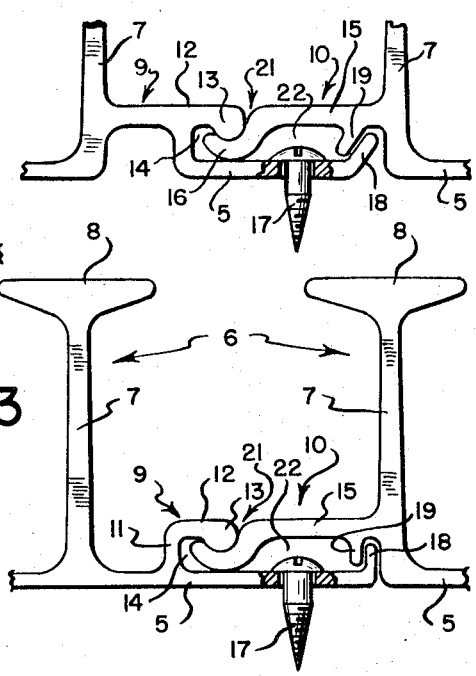
INVENTOR
Carl O. Thurnau
BY
ATTORNEYS United States Patent Office 3,368,315
Patented Feb. 13, 1968

ABSTRACT OF THE DISCLOSURE

An extruded floor section upstanding from a bottom panel to support a cargo above the floor of refrigerating air, the panels having interlocking flanges adjacent one end of the bottom panel. The locking elements are both trough-shaped and provide a joint which can be sealed to prevent spoilable cargo from penetrating the bottom panel level.

This invention relates to extruded metal shapes for the cargo-supporting floor sections of vehicles or the like and, more particularly, to cooperating locking elements on opposite sides of each section for locking together adjacent panel-like sections.

In cargo vehicles such as truck trailers and railway cars, the provision of refrigeration for cooling the cargo has necessitated the development of cargo-supporting floor sections which rest on the conventional type floor of the vehicle but which support the cargo above the floor so that the refrigerated atmosphere within the vehicle can be circulated below as well as around the sides and top of the cargo. Such floor sections are described in the United States patents to Constance No. 2,786,556, Black No. 2,923,384 and Weiler No. 2,952,341. The floor sections are in the form of panels provided with upstanding supporting elements which hold the cargo spaced above the vehicle floor, and the supporting elements are spaced apart to permit cold air to circulate under the thus-supported cargo. The panel-like floor sections are provided with locking elements along two opposite sides to permit adjacent panels to be mechanically interlocked. The design of the panels, of the supporting elements and of the locking elements is such as to permit the entire section to be extruded or otherwise fabricated from billets of any appropriate metal such as aluminum.

I have now devised a novel locking structure for these extruded metal shapes which is capable of mechanically interlocking the panel-like floor sections and further capable of having the locking joints closed by a sealant or by welding and thus eliminate pockets in which decayable cargo materials might otherwise accumulate. This structure further prevents any liquid or moisture from penetrating the level of the structure where it might otherwise corrode or impair any insulation or structural material beneath the panel-like floor sections. The locking structure of the present invention comprises two cooperating locking elements one positioned along each of two opposite edges of the bottom panel of the floor section. One locking element consists essentially of a flange projecting upwardly and outwardly and of such configuration as to form a trough-shaped arcuate slot the lowest portion of which is provided by the upper surface of the bottom panel, and the other locking element consists essentially of a flange projecting outwardly beyond the proximate edge of the bottom panel and substantially parallel thereto, the outermost end of the projecting flange terminating in a trough-shaped arcuate portion of mating proportions with the arcuate slot of the other locking element.

These and other novel features of the invention will be more fully understood from the following description taken in conjunction with the accompanying drawing in which—

FIG. 1 is a partial perspective view of a floor panel embodying the invention;

FIG. 2 is an end view of adjacent portions of interlocked floor panels showing the locking structure in greater detail; and FIGS. 3, 4 and 5 are views similar to FIG. 2 but showing additional modifications of the locking structure of the invention.

As shown in FIG. 1, the floor section is an elongated extruded metal shape of aluminum alloy or the like raving a bottom panel 5 and laterally-shaped longitudinally extending upright supporting elements 6. The supporting elements are advantageously formed by an upstanding web portion 7 and a top horizontally-disposed flange 8 which provides a cargo-carrying platform with space between the webs for circulation of refrigerated air. The webs may, of course, be provided if desired with conventional openings to facilitate cross-circulation of air through the webs 7. Two opposite edges of the bottom panel, the longitudinal edges in the panel shown in FIG. 1, are provided with locking elements 9 and 10 forming the locking structure of the invention.

As shown in detail in FIG. 2, the locking element 9 along one edge of a floor panel 5 interlocks with the other locking element 10 along the other opposite edge of an adjoining panel 5. The locking element 9 comprisces a flange advantagesly struck up from the bottom panel 5 and having an upstanding portion 11 and an outwardly projecting portion 12. The portion of the bottom panel 5 between the outermost web 7 and the upstanding portion 11 of the locking element 9 can be in the plane of the remainder of the bottom panel as shown in FIG. 2 or can be raised as shown in FIG. 5. The extremity of the outwardly projecting portion 12 is provided with a downwardly projecting semi-spherical protuberance 13 so that the lowermost surface of the protuberance 13 and the upper surface of the bottom panel 5 form an upright trough-shaped arcuate slot 14. The other locking element 10 comprises a flange advantageously struck out from the outermost web 7 and having an outwardly projecting portion 15 substantially parallel to but spaced from the bottom panel 5 and extending beyond the edge of the bottom panel. The outermost end of the flange of locking element 10 terminates in an upright trough-shaped portion 16 of mating proportions with the arcuate slot 14 of the other locking element 9.

The mating arcuate configuration on the slot 14 in the locking element 9 and of the terminal portion of the other locking element 10 simplifies the interlocking of adjacent floor sections. Thus, after one floor section is in place and is secured to the floor of the vehicle by any appropriate means such as screws 17 extending downwardly through the bottom panel 5, and advantageously sealed against moisture by an elastic washer or sealant, the next adjacent floor section is tilted so as to direct its terminal arcuate flange portion 16 into the slot 14 of the other locking element 9 of the first-mentioned floor section. By moving the terminal flange portion toward the other locking element 9 and simultaneously lowering the opposite side of the second-mentioned floor section, the arcuate flange portion 16 enters the arcuate slot 14 with a sliding and rocking movement until the second-mentioned floor section is seated on the main floor surface of the vehicle. The two floor sections are thus interlocked and will remain in their set position.

Where it is desirable to further reinforce the interlocking of the adjacent floor sections, I have found it advantageous to provide supplemental lateral locks such as are shown in FIGS. 3, 4 and 5. In FIG. 3, the supplemental lock is provided by an upstanding flange 18 formed at the edge of the bottom panel 5 outboard of the locking element 9 and by a cooperating downwardly projecting flange 19 provided on the underside of the horizontal flange portion 15 of the other locking element 10 but spaced outwardly from the web 7 by a distance slightly greater than the thicknes of the upstanding flange 18. Thus, as the second-mentioned floor section is lowered into place, the upstanding flange 18 enters the space between the depending flange 19 and the adjacent web 7 and reinforces the interlock of the main locking elements 9 and 10. Further reinforcement and immobility is imparted to the interlocked floor sections, as shown in FIG. 4, by providing a second upstanding flange 20 positioned inboard from the outer flange 18 by a distance substantially equal to the thickness of the depending flange 19 on the underside of the locking element 10. A particularly satisfactory supplemental lock is shown in FIG. 5 wherein the locking element 9 is located in the same horizontal plane with the locking element 10 to eliminate low points and blind spots and to facilitate washing and cleaning of the panel-like floor sections. The sloping lower supplemental lock element 18 is at an inclined angle with the bottom panel 5, and the upper sloping supplemental lock element 19 is also inclined at approximately the same angle to the horizontal projection 15 of the main lock. After the second-mentioned panel-like floor section is lowered into place, the upper supplemental lock element 19 will mate with the lower supplemental lock element 18. When sealant is applied to the lower element 18 before assembly, it will be compressed and extruded to completely fill the joint when elements 19 and 18 are in their final assembled position.

After the floor sections have been interlocked in place, they can be sealed so as to present a water-impervious floor to permit cleaning. The sealing may be accomplished with any conventional sealant applied in the groove 14 formed between the outboard extremity of the rounded protuberance on the locking element 9 and the upper portion of the trough-shaped extremity of the other locking element 10. The immobility of the floor sections provided by the novel locking device of the invention insures the integrity of the resulting seal. If desired, however, this same joint can be sealed by welding the V-shaped curved groove 21 formed by the elements 13 and 15 in order to form a permanent floor structure. In FIGS. 2, 3, 4 and 5 a closed channel 22 is formed within the interior of the lock joint of the assembled panel-like floor sections. Any liquid or moisture that may leak or seep through the upper sealed joint 21 due to weld or sealant imperfections will collect in this closed channel 22 and will drain and be removed from the floor or panel assembly to an appropriate collecting gutter or device for discharge to the exterior of the vehicle or container.

The novel locking structure of the invention is not limited or restricted to panel-like floor sections used in the truck and trailer cargo supporting floors or in transport containers. Any panel-like section may be joined with other panels using this type of lock joint to suit the requirements of the panel sections.

I claim:

1. In an elongated extruded metal shape adapted to form one section of a floor of interlocked sections for the cargo of vehicles and the like, said shape having a bottom panel and laterally-spaced longitudinallly-extending upright supporting elements integrally secured to the upper surface of the bottom panel, and two cooperating locking elements one positioned along each of two opposite edges of the bottom panel, the improvement which comprises (a) one locking element consisting essentially of a flange positioned outboard of its proximate endmost upright supporting element and projecting upwardly and outwardly with such configuration as to form a slot between the flange and the upper surface of the bottom panel, the outermost portion of said flange having a lower surface convexly arcuate in shape so as to impart to the slot a substantially horizontal trough-like shape, and (b) the other locking element consisting essentially of a substantially horizontal flange projecting outwardly from its proximate endmost upright supporting element and beyond the proximate edge of the bottom panel in a direction substantially parallel thereto, the outermost portion of the flange terminating in a substantially horizontal trough-like shape the upper surface of which is concavely arcuate to mate with the arcuate shape of the first-mentioned flange substantially intermediate the two mentioned endmost upright supporting elements of adjoining extruded metal shapes.

2. A metal shape according to claim 1 in which the uppermost surface of the first-mentioned locking element is joined to said proximate endmost upright supporting element by a web portion substantially parallel to the bottom panel but spaced thereabove substantially in the plane of the horizontal projecting flange of the second-mentioned locking element.

References Cited

UNITED STATES PATENTS

| | | | |
|---|---|---|---|
| 2,786,556 | 3/1957 | Constance | 52—588 |
| 2,923,384 | 2/1960 | Black | 52—588 |
| 2,952,341 | 9/1960 | Weiler | 52—588 |
| 3,100,556 | 8/1963 | De Ridder | 52—588 |
| 3,110,371 | 11/1963 | De Ridder | 52—588 |
| 3,229,438 | 1/1966 | Flagan | 52—588 |
| 3,092,220 | 6/1963 | Black | 52—630 |

HENRY C. SUTHERLAND, *Primary Examiner.*

FRANK ABBOTT, *Examiner.*

ROBERT A. STENZEL, R. S. VERMUT,
*Assistant Examiners.*